United States Patent
Tzeng et al.

(10) Patent No.: US 6,885,673 B1
(45) Date of Patent: Apr. 26, 2005

(54) QUEUE PAIR WAIT STATE MANAGEMENT IN A HOST CHANNEL ADAPTER

(75) Inventors: Shr-jie Tzeng, Fremont, CA (US); Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 897 days.

(21) Appl. No.: 09/860,400

(22) Filed: May 21, 2001

(51) Int. Cl.[7] .............................................. H04L 12/56
(52) U.S. Cl. ...................... 370/412; 370/235; 370/450; 709/250; 710/58; 710/117
(58) Field of Search ............................... 370/412–419; 710/1–74, 117; 709/249–250

(56) References Cited

U.S. PATENT DOCUMENTS

| | | | |
|---|---|---|---|
| 6,480,500 B1 * | 11/2002 | Erimli et al. ................ | 370/412 |
| 6,546,434 B1 * | 4/2003 | Snow et al. ................. | 719/324 |
| 6,622,193 B1 * | 9/2003 | Avery .......................... | 710/263 |
| 2002/0085493 A1 * | 7/2002 | Pekkala et al. ............. | 370/235 |
| 2002/0159385 A1 * | 10/2002 | Susnow et al. ............. | 370/229 |

OTHER PUBLICATIONS

Mellanox Technologies Inc., "Understanding PCI Bus, 3GIO and InfiniBand Architecture", Dec. 2001, White Paper Doc# WP120501100, pp. 1–8.*

Pendery et al., "InfiniBand Architecture: Bridge Over Troubled Water", Apr. 2000, Illuminata Inc., pp. 1–8.*

Daniel Cassiday, InfiniBand™ Architecture Tutorial; Hot Chips, Aug. 2000, Sun Microsystems.

* cited by examiner

*Primary Examiner*—Kenneth Vanderpuye
*Assistant Examiner*—Tri H. Phan
(74) *Attorney, Agent, or Firm*—Manelli Denison & Selter PLLC; Leon R. Turkevich

(57) ABSTRACT

A host channel adapter configured for outputting packets according to InfiniBand™ protocol includes a queue pair attributes table having queue pair entries configured for specifying attributes of the respective queue pairs. Each queue pair entry includes a timestamp field for storing a time value. Upon teardown of a queue pair, a management agent stores a timestamp value, according to a prescribed time resolution interval, within the timestamp field and sets a corresponding wait state bit. The queue pair attributes table is accessed each prescribed time resolution interval for identification of idle queue pairs having passed a minimum idle interval at least equal to the prescribed time resolution interval. If an identified idle queue pair has a corresponding timestamp value indicating passing of the minimum time idle interval, the corresponding wait state bit is reset enabling the queue pair to be reused.

12 Claims, 3 Drawing Sheets

QUEUE PAIR WAIT STATE MANAGEMENT IN A HOST CHANNEL ADAPTER

BACKGROUND OF THE INVENTION

FIELD OF THE INVENTION

The present invention relates to a host channel adapter configured for communication with target channel adapters, and managing queue pairs prior to reclaiming, in an InfiniBand™ server system.

BACKGROUND ART

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the microprocessor speed and bandwidth have exceeded the capacity of the connected input/out (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between central processing units, peripherals, and switches inside a server system. Hence, the term "InfiniBand™network" refers to a network within a server system. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading"), hence offloading the operating system of the server system.

However, there do not yet exist actual hardware implementations of the InfiniBand™ devices, hence arbitrary hardware implementations may result in substantially costly hardware designs. For example, the InfiniBand™ Architecture Specification specifies that queue pairs (QPs), data structures used to identify communications between a requester and a responder within the InfiniBand™ network, can only be reused after a prescribed wait interval following teardown of the communication manager. This prescribed wait interval is based on Transmission Control Protocol (RFC 793 of the Internet Engineering Task Force), which defines the finite lifetime of an IP datagram as a Maximum Segment Lifetime (MSL). Although the InfiniBand™ Architecture Specification specifies a required delay of twice the Packet Lifetime value plus the remote node's acknowledgement delay, an inefficient hardware implementation may result in an unnecessarily complex system. For example, use of a content addressable memory (CAM) to track whether idle queue pairs can be reclaimed for reuse would result in an unnecessarily expensive system.

SUMMARY OF THE INVENTION

There is a need for an arrangement that enables a host channel adapter to be implemented in an efficient and economical manner.

There also is a need for an arrangement that enables a host channel adapter to track whether idle queue pairs can be reclaimed for reuse in an economical and efficient manner.

These and other needs are attained by the present invention, where a host channel adapter configured for outputting packets according to InfiniBand™ protocol includes a queue pair attributes table having queue pair entries configured for specifying attributes of the respective queue pairs. Each queue pair entry includes a timestamp field for storing a time value. Upon teardown of a queue pair, a management agent stores a timestamp value, according to a prescribed time resolution interval, within the timestamp field and sets a corresponding wait state bit. The queue pair attributes table is accessed each prescribed time resolution interval for identification of idle queue pairs having passed a minimum idle interval at least equal to the prescribed time resolution interval. If an identified idle queue pair has a corresponding timestamp value indicating passing of the minimum time idle interval, the corresponding wait state bit is reset enabling the queue pair to be reused. Hence, idle queue pairs waiting to be reclaimed (i.e., reused) can be economically managed by accessing the queue pair attributes table each prescribed time resolution interval to determine if any of the idle queue pairs have a timestamp value indicating the corresponding queue pair has passed the minimum idle interval.

One, aspect of the present invention provides a method. The method includes initiating teardown of a queue pair to an idle queue pair by setting a corresponding wait state bit and storing a timestamp value, according to a prescribed time resolution interval, in a corresponding timestamp field within a queue pair attributes table. The method also includes accessing the queue pair attributes table each prescribed time resolution interval for identification of idle queue pairs having passed a minimum idle interval at least equal to the prescribed time resolution interval, and resetting the wait state bit of a corresponding identified queue pair based on the corresponding timestamp value indicating passing of the minimum idle interval. Storing the timestamp value according to the prescribed time resolution interval coincidentally with setting the corresponding wait state bit provides an efficient way of identifying the duration of the idle interval for the corresponding queue pair undergoing a teardown operation. Moreover, the independent accessing of the queue pair attributes table at each prescribed time resolution interval enables idle queue pairs to be identified with minimal complexity, using for example a random access memory for storage of the queue pair attributes table and a management agent that requires relatively little bandwidth access to the queue pair attributes table compared to other agents configured for establishing and maintaining queue pair connections.

Another aspect of the present invention provides a host channel adapter. The host channel adapter includes a queue pair attributes database configured for storing queue pair entries specifying attributes of respective queue pairs, each queue pair entry including a timestamp field, and a queue pair management state machine configured for specifying each queue pair as having one of an in-use state, a wait state, and an idle state available for reuse, and updating the queue pair attributes database based on received queue pair connection requests. The queue pair management state machine, upon specifying a wait state for a corresponding queue pair, stores in the corresponding timestamp field a timestamp value according to a prescribed time resolution interval. The queue pair management state machine also respecifies identified queue pairs from the wait states to the idle states available for reuse based on accessing the queue pair attributes table, each prescribed time resolution interval, for identification of the identified queue pairs having the wait state for at least a minimum idle interval at least equal to the prescribed time resolution interval.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
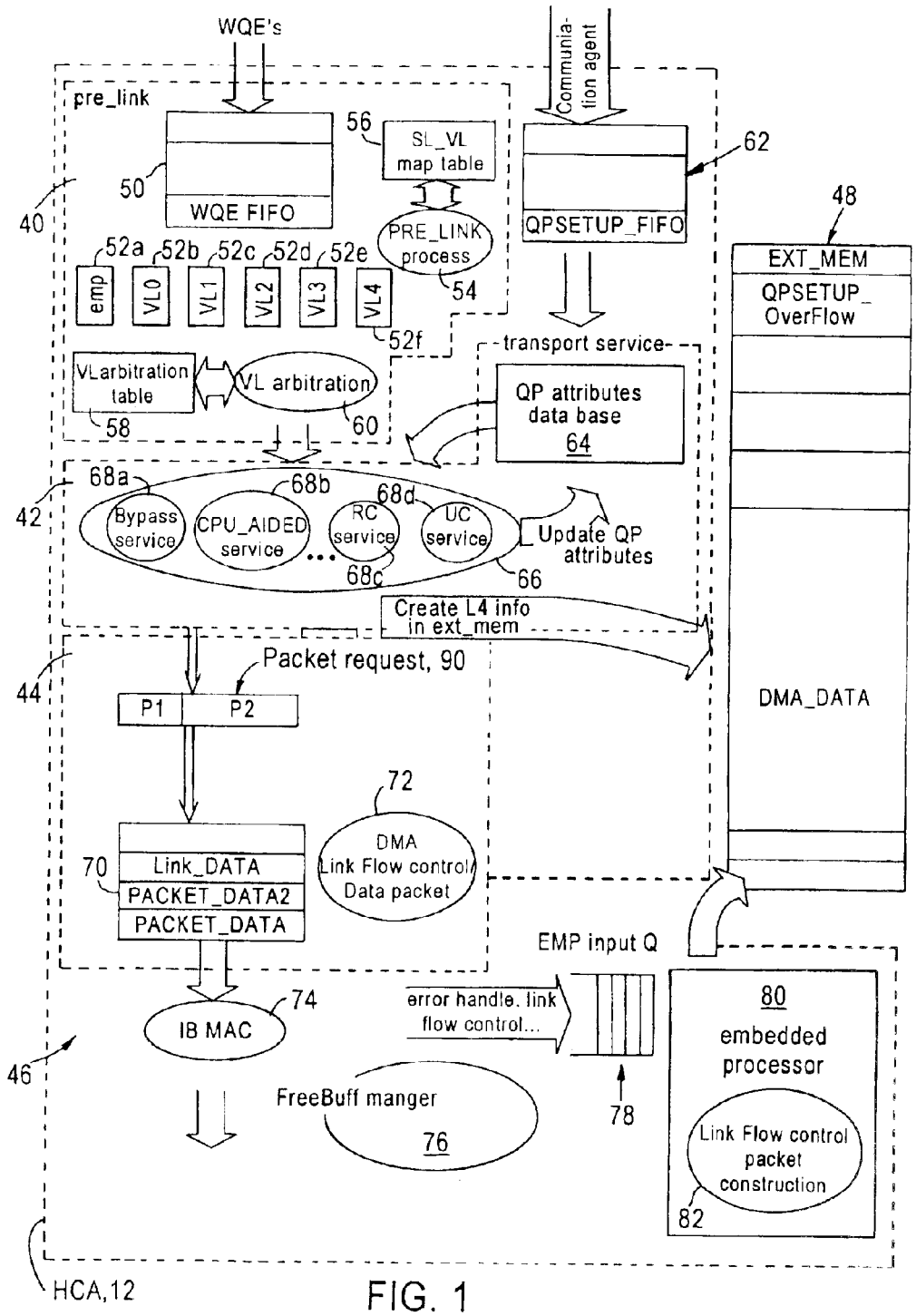
FIG. 1 is a diagram illustrating a host channel adapter configured for generating transmit packets according to an embodiment of the present invention.

FIG. 1 is a block diagram illustrating a host channel adapter (HCA) 12 configured for generating and outputting transmitting packets according to an embodiment of the present invention. The HCA 12, compliant with the Infini-Band™ Architecture Specification, is implemented in a manner that ensures that hardware resources are efficiently utilized by generating transmit packets according to a priority-based ordering. In addition, the disclosed HCA 12 provides flexibility by enabling embedded processes to be added without disruption of traffic flow. Hence, the HCA 12 can be implemented in an economical manner with minimal complexity relative to conventional implementation techniques.

One problem with conventional arrangements for implementing the HCA 12 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including service layer and virtual lane mapping, link layer flow control packet generation, link layer transmission credit checking, and other operations. Although this conventional type of implementation has the advantage of precisely following the network layers specified in the InfiniBand™ Architecture Specification, such an arrangement requires a substantially large amount of hardware. In particular, the transport layer generally requires more processing power than the link layer because the transport layer involves more complex operations. Hence, there is a need that the implementation of the transport layer in hardware does not result in a substantially complex hardware system. In addition, there is a concern with unnecessarily wasting transport layer resources on low priority operations.

According to the disclosed embodiment, link layer operations are partitioned based on the desirability to determine priorities of data packets to be transmitted. In particular, the HCA 12 of FIG. 1 includes a pre-link module configured for determining a priority of received WQEs, and a post-link module configured for preparing a data packet for transmission on the network. The pre-link module 40 orders the WQEs according to priorities determined by the pre-link module, and outputs the WQEs in the determined order to a transport service module 42 configured for generating the appropriate transport layer headers for the WQEs based on the associated queue pair attributes. In other words, the pre-link module 40 prevents the transport service module 42 from wasting resources on low priority WQEs or blocking high priority WQE's within the transport layer process. Hence, higher priority connections obtain improved service at the transport layer through the HCA.

The HCA 12, implemented for example as an application-specific integrated circuit, includes a pre-link module 40, a sport service module 42, a post-link module 44, and a media access control (SAC) module 46. The HCA 12 also has local access to a memory 48 configured for storing transport data and overflow buffers, described below.

The pre-link module 40 includes a work queue element FIFO 50, virtual lane FIFOs 52, a pre-link process module 54, a service layer to virtual lane (SL-VL) mapping table 56, a virtual lane (VL) arbitration table 58, and a virtual lane (VL) arbitration module 60.

The HCA 12 is configured for receiving data from a central processing unit (CPU) in the form of work queue elements (WQEs), stored in the WQE FIFO 50. Each WQE specifies a corresponding request, from a consumer application executed by the CPU (i.e., "requester"), for a corresponding prescribed operation to be performed by a destination InfiniBand™ network node (i.e., "responder"), for example a target. The interaction between requester and responder is specified via a queue pair (QP), where a queue pair includes a send work queue and a receive work queue.

The WQE includes service level (SL) information, and a pointer to the location of the actual message in the system memory 48. The InfiniBand™ Architecture Specification defines a service level (SL) attribute that permits a packet traversing the InfiniBand™ network 10 to operate at one of sixteen available service levels. Hence, the requester can select an available service level (e.g., quality of service, priority, etc.) based on a selected priority of the WQE.

The pre-link module 40 provides both service level to virtual lane mapping (SL-VL mapping), and virtual lane arbitration. In particular, virtual lanes, defined in the InfiniBand™ Architecture Specification, enable multiple logical flows to be implemented over a single physical link, where link level flow control can be applied to one virtual lane without affecting other virtual lanes. The pre-link process module 54 is configured for managing and maintaining the service layer-virtual layer mapping table 56. In particular, the pre-link process module 54 retrieves a WQE from the WQE FIFO 50, and determines the corresponding virtual lane based on the service layer specified within the WQE. Upon identifying the appropriate virtual lane for the retrieved WQE, the pre-link process module 54 forwards the WQE to the corresponding virtual lane FIFO 52.

The pre-link module 40 includes virtual lane FIFOs 52a, 52b, 52c, 52d, 52e, and 52f for storage of WQEs based on the assignment by the pre-link process module 54. For example, the virtual lane FIFO 52a is used for storing WQEs associated with embedded processor operations, for example link layer control packets and handling of error conditions. In other words, when a prescribed operation is not implemented in hardware, the request is sent to an embedded processor queue 78 for further processing by an embedded processor 80, described below; hence the embedded processor 80 has its own assigned queue 52a for outputting packets into the flow of output data traffic. The virtual lane FIFO 52b is used for storing WQEs associated with management traffic. The virtual lane FIFOs 52c, 52d, 52e, and 52f are used for storing WQEs associated with respective assigned virtual lanes. Although the disclosed embodiment discloses the use of four assigned virtual lanes, additional virtual lane FIFOs may be added for additional assigned virtual lanes.

The VL arbitration module 60 is implemented as a state machine with registers, and is configured for managing the VL arbitration table 58 for servicing of the virtual lanes, including setup, management, and teardown of the virtual lanes. The VL arbitration module 60 also determines which virtual lane to service, and outputs the WQEs from the virtual lane FIFOs 52 based on the determined priority of the virtual lanes. For example, the virtual lane FIFO 52b typically stores management (high-priority) traffic, hence the VL arbitration module 60 typically would empty the virtual lane FIFO 52b before servicing the other virtual lane FIFOs 52c, 52d, 52e, or 52f. The VL arbitration module 60 would then selectively output the WQEs from the virtual lane FIFOs 52c, 52d, 52e, or 52f based on weighted priorities stored in respective weight tables within the VL arbitration table 58.

Hence, the per-link module 40 outputs the WQEs in a prescribed order based on a determined priority of the WQEs, for example based on assigned virtual lanes, or whether the WQE is for an embedded process or management traffic.

The transport service module 42 is configured for managing transport services, including setup, management, and teardown of queue pairs. In particular, the HCA 12 includes a queue pair setup FIFO 62 configured for storing queue pair commands received from a communication agent. The communication agent is responsible for setup and teardown of transport connections: the communication agent communicates with a subnet manager to establish the transport connections (i.e., queue pairs) for the HCA 12. For example, the communication agent will determine the type of transport layer service to be used for communication, such as reliable connection service, reliable datagram service, unreliable connection service, unreliable datagram service, etc.; the communication agent will also determine a packet sequence number to be used at each end of the communication; the communication agent also will also determine what queue pair numbers are to be used for communication. For example, the local communication agent may elect to use queue pair number "10" and packet sequence number starting with "100", whereas the remote communication agent may elect to use queue pair number "100" and start the packet sequence number at "20". In addition, the communication agents at each end during connection establishment use a bypass service (described below with respect to bypass service submodule 68a), as opposed to a conventional transport layer service, to establish the transport connections.

The transport service module 42 includes a queue pair attributes database 64 and a queue pair attributes management module 66. The queue pair attributes management module 66 is configured for processing the queue pair commands in the queue pair setup FIFO 62, and updating the queue pair attributes database 64 based on the received queue pair commands. For example, the queue pair attributes database 64 stores information relating to a source queue pair number, a destination queue pair number, and possibly source agent and destination agent. Hence, the queue pair attributes database 64 will include all information necessary to support the different transport services, including reliable connection service, reliable datagram service, unreliable connection service, unreliable datagram service, and raw datagram service.

The queue pair attributes management module 66 manages the transport services by updating the queue pair attributes database 64 during communication between the local and remote communication agents, for example when packet sequence numbers increase as messages are exchanged between the local and remote communication agents. Additional details regarding the teardown of queue pairs are described below with reference to FIG. 2 and FIGS. 3A and 3B.

The queue pair attributes management module 66 also includes service submodules 68, each configured for managing a corresponding transport service type based on a corresponding received WQE from the pre-link module 40. For example, the bypass service submodule 68a is configured for managing bypass services during connection establishment or managing queue pairs associated with management operations with network managers that use, for example, the raw datagram service. The CPU aided service submodule 68b is configured for managing queue pairs based on embedded processor operations using the embedded virtual lane FIFO 52a; hence, the CPU aided service submodule 68b enables coordination between the local and remote embedded processes; moreover, implementation of the CPU aided service submodule 68b in conjunction with the embedded virtual lane FIFO 52a enables messages to be retransmitted if a resend request is received from the remote communication agent. The reliable connection (RC) service submodule 68c and the unreliable connection (UC) service submodule 68d are configured for managing queue pairs associated with reliable connection and unreliable connection transport services, respectively. Although not shown, the queue pair attributes management module 66 also includes submodules 68 for managing reliable and unreliable datagram services, and raw datagram service.

Hence, the transport service module 42, upon receiving a WQE from the pre-link module 40, supplies the WQE to the appropriate submodule 68 for processing (e.g., WQE for RC service handled by the RC service submodule 68c). The WQE includes service level (SL) information, and a pointer to the location of the actual message in the system memory 48. The submodule 68, in response to reception of the appropriate WQE, parses the WQE, and retrieves from the WQE the pointer that identifies the memory location for the transport data (i.e., the payload for the transport layer); the submodule 68 performs a DMA fetch of the transport data, updates the appropriate queue pair attributes within the queue pair attributes database 64, and creates and stores in the external memory 48 a transport layer header for the WQE in a corresponding transport format; for example, the submodule 68a may generate a raw transport header, whereas the modules 68c or 68d may generate a transport header according to the reliable connection service or the unreliable connection service, respectively.

The submodule 68 then creates a header pointer (p1) that identifies the location of the transport layer header. The submodule 68 then sends to the post-link module 44 the payload pointer (p2) and the header pointer (p1) as a packet request 90, enabling the post-ink module 44 to assemble the transport packet for transmission based on the supplied pointers. Alternately, the submodule 68 may generate a frame pointer to a system memory location that stores the transport layer frame, including the transport layer header and the transport data. If preferred, the submodule 68 also could forward the transport layer frame (including transport layer header and transport data) to the post-link module. Alternately, while writing to the external memory, the CPU may leave blank spaces at the beginning of the data, so that the actual header information that is created within the modules 68 can be stored in the corresponding empty memory space. The pointer passed down to the post-link module 44 could be this pointer which points to the beginning of the frame in the external memory.

The post-link module 44, in response to reception of the transport layer information (e.g., transport layer frame, packet request, etc.), fetches the transport layer header and the transport layer payload from the system memory 48 for generation of the transmit packet and storage in a transmit FIFO 70. In particular, the post-link module 44 also includes a link layer control module 72 configured for generating the transmit packet by generating link layer fields (e.g., local and global routing headers, cyclic redundancy check (CRC) fields, etc.), storage of the transmit packet in the transmit FIFO 70, and handling link layer control operations according to the InfiniBand™ Architecture Specification. Once the transmit packet has been generated, the pointers are forwarded to the free buffer manager 76, described below.

The link layer control module 72 outputs the transmit packets according to a credit-based flow control. In particular, the link layer control module 72 monitors the available credits for transmission of a transmit packet on the assignment virtual lane. In particular, credits are sent on a per virtual lane basis, where a receiver issues a credit based on packets taken from an incoming virtual lane buffer; the credits are sent to the sender, enabling the sender to manage flow control. Hence, if the link layer control module 72 determines that an identified virtual lane has an insufficient number of credits, the link layer control module 72 defers transmission of the corresponding transmit packet until a sufficient number of credits have been received. If the virtual lane has a sufficient number of credits, the link layer control module 72 forwards the transmit packet to the MAC module 46 for transmission.

The MAC module 46 is configured for outputting the transmit packet stored in the transmit FIFO 70 according to the InfiniBand™ Architecture Specification. In particular, the MAC module 46 includes a transmission module 74, a free buffer manager 76, an embedded processor input queue 78, and an embedded processor 80 having a link low control packet construction module 82. The transmission module 74 is configured for performing media access control operations, and optionally physical layer transceiver operations, for transmission of the transmit packet onto the InfiniBand™ network 10.

The free buffer manager 76 is configured for releasing available space from the external memory 48 once the transmit packet has been successfully received by the responder. In particular, the memory pointers for a transmit packet are sent from the post-link module 44 once the transmit packet has been generated; if a responder sends a message that the transmit packet needs to be resent in a reliable connection service, the transmit packet can be regenerated by the post-link module 44 and retransmitted to the responder. Once the transmit packet is successfully received, the frame pointers can be released for use by another agent.

Flow control is handled by the embedded processor 80 based on reception of information from the embedded processor input queue 78: in particular, the flow control protocol according to the InfiniBand™ Architecture Specification uses a credit-based flow control. The embedded processor 80 generates link flow control packets using the link flow control packet construction module 82, based on messages stored into the embedded processor input queue 78. The embedded processor 80 writes the link flow control packet to external memory 48; the embedded processor 80 then generates a WQE that includes the associated operation and a pointer specifying the location of a flow control packet into the embedded processor virtual lane FIFO 52a. The link flow control packet can then be output, specifying a number of available credits for another transmitting note.

Hence, the embedded processor 80 can generate a link flow control frame including the flow control header, and output the link flow control frame to the error processor input queue 78 for transmission to the network.

Figure 2:
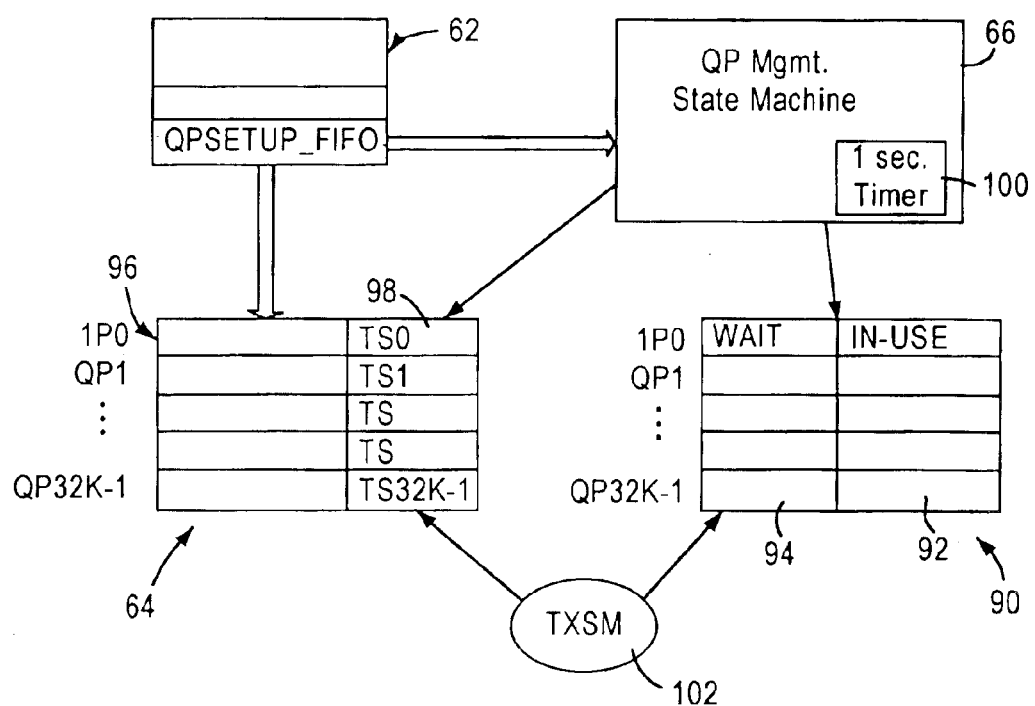
FIG. 2 is a diagram illustrating in more detail the host channel adapter configured for queue pair wait state management according to an embodiment of the present invention.

FIG. 2 is a diagram illustrating in further detail the arrangement for managing queue pairs during teardown of a connection according to an embodiment of the present invention. The queue pair attributes database 64 is controlled by the queue pair management state machine 66 based on queue pair setup requests received from the queue pair setup FIFO 62. The state of the each of the 32,768 (32K) available queue pairs is specified by a queue pair status RAM 90, which is an on-chip RAM on the HCA 12. In particular, the queue pair management state machine 66 specifies each queue pair as having an in-use state based on setting an in-use bit 92, a wait state based on setting a wait state bit 94, or an idle state available for use based on the in-use bit 92 and the wait state bit 94 each having zero values (0, 0).

The queue pair attributes database 64, implemented using an on-chip RAM on the HCA 12, stores 32K queue pair entries 96 that specify attributes of respective queue pairs. Each queue pair entry 96 includes a timestamp field (TS) 98 used by the queue pair management state machine 66 for maintaining a wait state for the queue pairs during teardown. In particular, the InfiniBand™ Architecture Specification specifies that the "CM [connection manager] is responsible for placing QPs/EECs in the TimeWait state, for maintaining them in that state for a period not less than the TimeWait, and for removing them alterward"; the "TimeWait timer shall be set to twice thePathRecord:PacketLife-Time value plus the remote's Ack Delay." As described above, RFC 793 refers to this PacketLife-Time value as the maximum segment lifetime (MSL) having a defined value of two minutes, although RFC 793 notes that this value is an engineering choice that may be changed if dictated by experience. Strict implementation of the standard using current technology, for example using a system clock running at 100 MHz, could result in an unusually large timer requiring to count for a queue pair during the wait state.

According to the disclosed embodiment, the HCA 12 is configured for cycling through all 32K queue pairs in the maximum segment lifetime; if the clock cycle is 100 MHz, the MSL can be set to one second, enabling the availability of 100 M cycles to cycle through the 32K queue pairs. In other words, the queue pair management state machine 66 is capable of servicing 1 queue pair every 3000 (100 M/32K) cycles.

The queue pair management state machine 66 implements the access to the queue pair attributes database 64 and the queue pair status RAM 90 based on a one second timer 100 that specifies the prescribed time resolution interval to be used by the queue pair management state machine 66 to cycle through the queue pair attributes database 64 and the queue pair status RAM 90. As described below with respect to FIG. 3, setting the prescribed time resolution interval to one second enables a economical implementation for cycling the queue pairs through the necessary wait state prior to reuse.

Figure 3A:
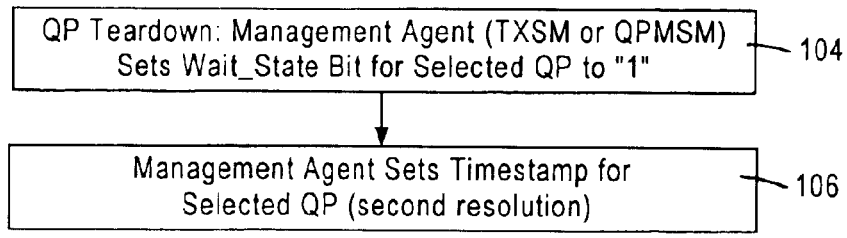
FIGS. 3A and 3B are diagrams summarizing the method of managing queue pairs during teardown according to an embodiment of the present invention.

FIG. 3A is a diagram illustrating the teardown of a queue pair. The teardown operation may be performed by the queue pair management state machine (QPMSM) 66, or by a transmit state machine (TXSM) 102 configured for sending data onto the InfiniBand™ network, either of which are referred to generally as a management agent. In particular, upon identifying a queue pair for teardown, the management agent (e.g., the QPMSM 66 or the TXSM 102) sets the wait state bit 94 for the selected queue pair to "1" in step 104, and sets in step 106 the timestamp 98 for the selected queue pair to the current (system) time using a 1-second resolution. As described below with respect to FIG. 3B, the one second resolution simplifies the determination of whether an idle queue pair has passed the minimum idle interval of 1 second.

Figure 3B:
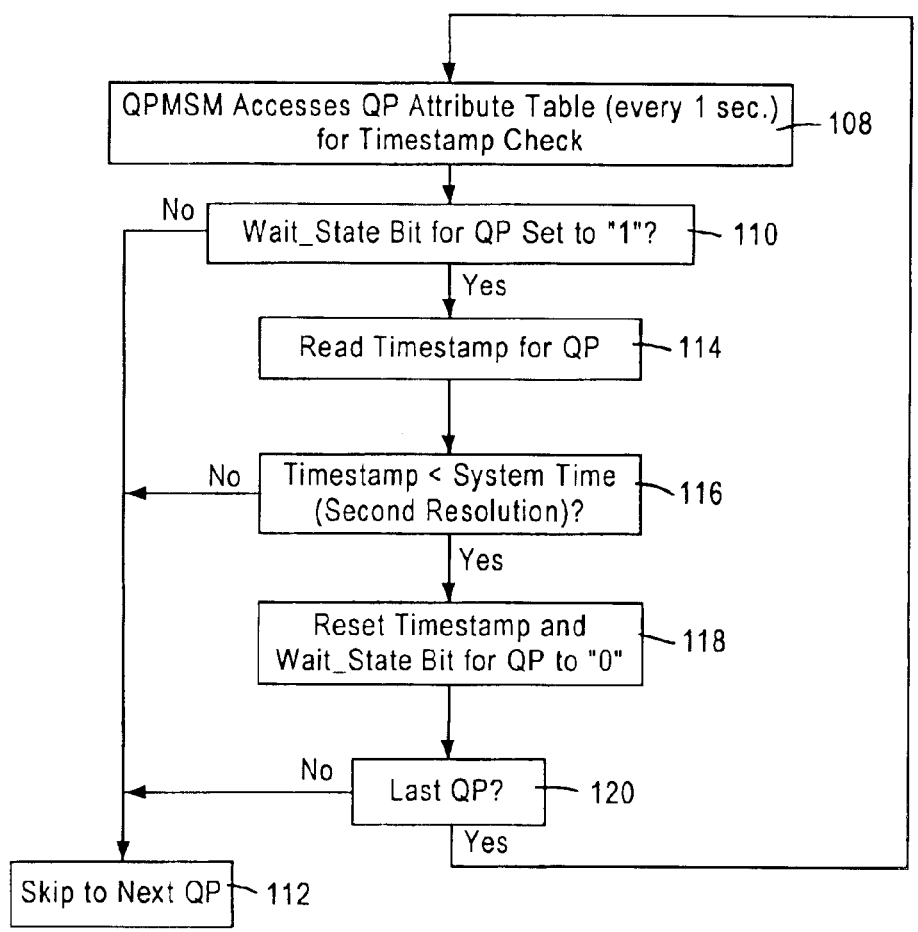

FIG. 3B illustrates the method by the queue pair management state machine 66 of resetting a queue pair from a wait state to an idle state available for reuse, according to an embodiment of the present invention. The queue pair management state machine 66 accesses the queue pair attributes table 64 in step 108 at each prescribed time resolution interval, for example one second for all 32K queue pairs, for identification of idle queue pairs having passed a minimum idle interval at least equal to the prescribed time resolution interval (e.g., one second). In other words, the queue pair management agent 66 only needs to access the queue pair attributes database 64 around every 3000 cycles, wherein all the 32K queue pair entries 96 are serviced within the prescribed time resolution interval of one second. Hence, the reference to accessing the queue pair attributes table each prescribed time resolution interval should be defined as accessing the 32K queue pair entries 96 during the prescribed time resolution interval, although individual queue pair entries 96 may be accessed every 3000 cycles.

The queue pair management state machine 66 checks in step 110 if the wait state bit 94 within the queue pair status RAM 90 is set to "1", indicating a queue pair in the wait state. If the wait state bit is not set to "1", the queue pair management state machine 66 can skip to the next queue pair in step 112. However if the wait state bit 94 is set to "1", the queue pair management state machine 66 reads in step 114 the corresponding timestamp 98 for the queue pair. If in step 116 the queue pair management state machine 66 determines that the timestamp value is not less than the system time according to a one-second resolution (e.g., the timestamp value and the system time value are equal), then the queue pair management state machine 66 maintains the wait state and skips to the next queue pair in step 112.

If in step 116 the queue pair management state machine 66 determines that the timestamp value is less than the system time according to the one-second resolution, indicating that the queue pair has passed the minimum idle interval of one second, the queue pair management state machine 66 resets in step 118 the timestamp field 98 and resets the wait state bit 94 to zero, enabling the corresponding queue pair to be reused. The queue pair management state machine 66 continues to the next queue pair in step 120, ensuring that all 32K queue pairs are serviced according to the prescribed time resolution interval (e.g., 1 second).

Hence, implementation of queue pair management can be economically implemented without loss of queue pair resources. The access of the 32K entries 96 each prescribed time resolution interval (e.g., 1 sec.) ensures that second-resolution comparisons in step 116 can be reliably preformed. Although the actual delay may be on the order of 1.2 to 1.6 seconds, the total wait state will not exceed 2 seconds. Hence, although the disclosed arrangement may be less precise than more costly content addressable memory based implementations, resulting in a lesser percentage of queue pairs available for reuse at any given time, the reduction in the queue pairs available for reuse is relatively insignificant.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a host channel adapter, the method comprising:
   initiating teardown of a queue pair to an idle queue pair by setting a corresponding wait state bit and storing a timestamp value, according to a prescribed time resolution interval, in a corresponding timestamp field within a queue pair attributes table;
   accessing the queue pair attributes table each prescribed time resolution interval for identification of idle queue pairs having passed a minimum idle interval at least equal to the prescribed time resolution interval; and
   resetting the wait state bit of a corresponding identified queue pair based on the corresponding timestamp value indicating passing of the minimum idle interval.

2. The method of claim 1, wherein the initiating step includes:
   accessing within the queue pair attributes table a queue pair entry configured for storing attributes for the queue pair, including the corresponding timestamp field; and
   setting the corresponding wait state bit in a queue pair status RAM.

3. The method of claim 2, wherein the initiating step is executed by one of a transmit state machine and a queue pair management state machine.

4. The method of claim 1, wherein the accessing step includes determining whether the idle queue pair has passed the minimum idle interval by determining whether the corresponding timestamp value has value less than a system time according to the prescribed time resolution interval.

5. The method of claim 4, wherein the prescribed time resolution interval and the minimum idle interval are equal.

6. The method of claim 4, wherein the prescribed time resolution interval and the minimum idle interval each have a duration substantially of one second.

7. The method of claim 5, wherein the accessing and resetting steps are executed by a queue pair management state machine, the resetting step enabling the idle queue pair to be reused.

8. A host channel adapter comprising;
a queue pair attributes database configured for storing queue pair entries specifying attributes of respective queue pairs, each queue pair entry including a timestamp field; and
a queue pair management state machine configured for specifying each queue pair as having one of an in-use state, a wait state, and an idle state available for reuse, and updating the queue pair attributes database based on received queue pair connection requests, wherein:
(1) the queue pair management state machine, upon specifying a wait state for a corresponding queue pair, stores in the corresponding timestamp field a timestamp value according to a prescribed time resolution interval, and
(2) the queue pair management state machine respecifies identified queue pairs from the wait states to the idle states available for reuse based on accessing a queue pair attributes table, each prescribed time resolution interval, for identification of the identified queue pairs having the wait state for at least a minimum idle interval at least equal to the prescribed time resolution interval.

9. The apparatus of claim 8, further comprising a queue pair status RAM configured for storing a wait state bit and an in-use state bit for each queue pair, the queue pair management state machine specifying each queue pair as having the one of the in-use state, the wait state, and the idle state available for reuse based on setting the corresponding wait state bit and the in-use state bit.

10. The apparatus of claim 8, wherein queue pair management state machine is configured for identifying each identified queue pair based determining whether the corresponding timestamp value has a value less than a system time according to the prescribed time resolution interval.

11. The apparatus of claim 10, wherein the prescribed time resolution interval and the minimum idle interval are equal.

12. The apparatus of claim 10, wherein the prescribed time resolution interval and the minimum idle interval each have a duration substantially of one second.

* * * * *